United States Patent [19]
Georges et al.

[11] Patent Number: 5,852,140
[45] Date of Patent: Dec. 22, 1998

[54] SEMISUSPENSION POLYMERIZATION PROCESSES

[75] Inventors: Michael K. Georges, Guelph; Raj D. Patel, Oakville, both of Canada

[73] Assignee: Xerox Corporation, Stamford, Conn.

[21] Appl. No.: 37,192

[22] Filed: Mar. 25, 1993

[51] Int. Cl.⁶ .................................. C08F 2/02; C08F 2/16
[52] U.S. Cl. .................................. 526/82; 526/65; 526/86; 526/88; 526/263; 526/303.1; 526/307.7; 526/316; 526/317.1; 526/328; 526/329.7; 526/334; 526/342; 526/345; 526/346
[58] Field of Search .................................. 526/65, 86, 88, 526/263, 303.1, 307.7, 316, 317.1, 328, 329.7, 334, 342, 345, 346, 82

[56] References Cited

U.S. PATENT DOCUMENTS 5,043,404  8/1991  Mahabadi et al. .................. 526/194
5,164,282  11/1992  Mahabadi .................. 430/109

*Primary Examiner*—David W. Wu
*Attorney, Agent, or Firm*—John L. Haack

[57] ABSTRACT

Disclosed is a process for the preparation of a polymer which comprises effecting bulk polymerization of a mixture of at least one monomer, a free radical polymerization initiator, and a stable free radical agent until from about 10 to about 50 weight percent of the monomer has been polymerized; optionally adding additional free radical initiator; optionally adding a colorant; dispersing with a high shear mixer the aforementioned partially polymerized mixture in water containing a stabilizing component selected from the group consisting of non-ionic and ionic water soluble polymeric stabilizers to obtain a suspension of particles with an average diameter of from about 0.1 to about 10 microns; polymerizing the resulting suspension to form said polymer.

42 Claims, No Drawings

SEMISUSPENSION POLYMERIZATION PROCESSES

BACKGROUND OF THE INVENTION

This invention is generally directed to semi-suspension polymerization processes, and more specifically to processes for the preparation of small polymeric particles, for example, in one embodiment with a volume average diameter of from about about 0.1 micron to about 5 microns. More specifically, the present invention is directed to semi-suspension polymerization processes for the preparation of economically submicron polymeric particles or polymer, useful as powder coatings such as carrier powder coatings, photoreceptor cleaning additives, and in some instances toner resins and toner compositions, wherein a mixture of monomer or comonomers, a free radical polymerization initiator, and a stable free radical agent are bulk polymerized until partial polymerization is accomplished, for example, in embodiments, from about 10 to about 50 percent of monomer or comonomers are converted to polymer, thereafter optionally adding additional free radical initiator and or optionally adding a colorant followed by dispersing the resulting partially polymerized monomer or comonomer mixture in water containing a stabilizing component with, for example, a high shear mixer, transferring the resulting suspension to a reactor and effecting polymerization, followed by optional isolation including preferably washing and drying the polymer product. As indicated herein, the polymers obtained with the process of the present invention can, for example, be selected as coatings for carrier components utilized in developer mixtures comprised of toner and carrier compositions; or as toner or liquid ink resin marking particles.

The formation of small polymeric particles for use in powder coatings, toner particles and toner additives has been generally accomplished by emulsion polymerization and dispersion polymerization processes wherein a polymer in a liquid is heated to above its melting temperature and then cooled in the liquid to form particles. With these processes, it has been difficult to achieve low cost, clean, that is, for example, with no, or substantially no, impurities on the surface of the resulting particles, and/or dry particles of small particle size. The particles formed by suspension polymerization are generally larger than 50 micrometers thus they are not usually desirable as powder coatings, toner particles or as toner additives. Grinding or attrition, especially fluid energy milling, of large particles to the size needed for powder coating and fine toner particles, that is for example from about 0.1 to about 5 microns, is often not desirable both from an economic and functional viewpoint. Powder coatings with submicron particles are desirable as it allows complete coating of the particle, such as carrier beads, with a thinner film than is possible if only large particles are used. Also, submicron particles are very difficult to obtain by grinding or attrition processes. Further, processes such as spray drying of polymers suspended in solvent can result in polymer particles with particle sizes larger than one micrometer and a wide size range as well as trapping of solvent which interferes with the use of particles for coatings. Moreover, the solvent recovery in these processes is very costly.

There is disclosed in U.S. Pat. No. 3,505,434 a process wherein particles for fluidized bed powder coating are prepared by dispersing the polymer in a liquid which is heated to above the polymer melting point and stirred causing the polymer particles to form. The particles are then cooled below their melting point and recovered. However, this process does not, for example, enable particles with a size of below 50 microns.

Also, the suspension polymerization of monomer is known for the formation of polymer particles generally in a size range of about 200 microns and higher. The main advantage of suspension polymerization is that the product may easily be recovered, therefore, such a process is considered economical. However, it is very difficult by suspension polymerization to prepare very small particles as the monomer droplets tend to coalesce during the polymerization process, especially in the initial stage of polymerization where the droplets are very sticky. For example, there is disclosed in U.S. Pat. No. 3,243,419 a method of suspension polymerization wherein a suspending agent is generated during the suspension polymerization to aid in the coalescence of the particles. Also disclosed in U.S. Pat. No. 4,071,670 is a method of suspension polymerization wherein the monomer initiator mixture is dispersed in water containing stabilizer by a high shear homogenizer, followed by polymerization of suspended monomer droplets.

Other patents of interest include U.S. Pat. No. 4,486,559, which discloses the incorporation of a prepolymer into a monomer toner mix followed by emulsion polymerization; U.S. Pat. Nos. 4,680,200 and 4,702,988, which illustrate emulsion polymerization.

Of interest to the present invention are related U.S. Pat. Nos. 5,043,404 and 5,164,282, and copending patent application U.S. Ser. No. 976,604 filed Nov. 16, 1992 now U.S. Pat. No. 5,322,912, the disclosures of which are incorporated by reference in there entirety. In U.S. Pat. No. 5,043,404 entitled "Semisuspension Polymerization Processes," there is illustrated a process for the preparation of polymeric particles which comprises mixing at least one monomer with a polymerization initiator, a crosslinking component and a chain transfer component; effecting bulk polymerization until from about 10 to about 50 weight percent of the monomer has been polymerized; dispersing the aforementioned partially polymerized product in water containing a stabilizing component to obtain a suspension of particles with an average diameter of from about 0.1 to about 5 microns in water; and polymerizing the resulting suspension and in U.S. Pat. No. 5,164,282, entitled "Processes for the Preparation of Toners," there is illustrated a process for the preparation of toner particles which comprises mixing at least one resin monomer with a polymerization initiator, a crosslinking component and a chain transfer component; effecting bulk polymerization until partial polymerization has been accomplished; mixing with the aforementioned partially polymerized product pigment or dye particles, thereby forming an organic phase; dispersing the organic phase in water containing a stabilizing component whereby there is obtained a suspension of toner particles in water; and polymerizing the toner suspension. In copending patent application U.S. Ser. No. 976,604 filed on Nov. 10, 1992, now U.S. Pat. No. 5,322,912 there is illustrated a free radical polymerization process for the preparation of a thermoplastic resin or resins comprising: heating a mixture of a free radical initiator, a stable free radical agent, and at least one polymerizable monomer compound to form a thermoplastic resin or resins with a high monomer to polymer conversion; cooling said mixture; optionally isolating the thermoplastic resin or resins; and optionally washing and drying the thermoplastic resin or resins.

There thus remains a need for a process of obtaining very small polymeric particles, and more specifically submicron and micron polymeric particles having specific molecular weight properties and certain physical characteristics arising from said molecular weight properties. Further, there is a need for semisuspension polymerization processes for obtaining clean and dry small, for example, from about 0.1 to about 5 microns in average diameter as determined by a scanning electron microscope, polymeric particles. Further, there is a need for semisuspension polymerization processes that enable reproducible sequential initial bulk and secondary suspension polymerization processes that afford consistency of molecular weight properties, viscosity and monomer conversion among batches while avoiding complications associated with the known gel effect. Further, there is a need for semisuspension polymerization processes that permit low cost, clean and dry submicron or micron polymeric particles that can be selected as carrier powder coatings, fine toner particles for dry and liquid electrophotographic development applications, and as toner additives for photoreceptor cleaning. Still further there remains a need for semisuspension polymerization processes which provide the aforementioned small polymeric particles having: narrow polydispersity molecular weight properties; optionally mixtures of monomodal polymers or copolymers; and processes which clearly and economically afford the desired resins and particles without complications attributable to known and difficult to control exotherms, particularly in initial bulk polymerization stages.

SUMMARY OF THE INVENTION

It is, therefore, an object of this invention to provide processes for polymeric particle formation with many of the advantages illustrated herein.

In another object of the present invention there are provided simple processes for the formation of small polymeric particles, and more specifically polymeric particles of less than about 7 microns.

Yet, in another object of the present invention there are provided simple and economical processes for the formation of polymeric particles, and more specifically submicron size polymeric particles, or polymers.

Another object of the present invention resides in the provision of simple and economical processes for the preparation of low cost, clean, that is substantially no impurities, and dry polymeric particles, especially polymeric particles for powder coatings.

Another object of the present invention resides in simple and economical semisuspension polymerization processes for the preparation of low cost, clean and dry small polymeric particles, and more specifically submicron and micron size polymeric particles useful for fine toner particles.

Further, another object of the present invention resides in simple and economical processes for producing low cost, clean and dry polymeric particles especially polymeric particles useful as toner additives and photoreceptor cleaning additives.

Additionally, in another object of the present invention there are provided as a result of the enhanced degree of control and flexibility processes for the preparation of polymeric particles with improved flow and fusing properties.

In yet another object of the present invention there are provided simple and economical processes for producing polymeric particles having narrow molecular weight properties or polydispersities with little or no batch to batch variation. The polymeric particles of the present invention are obtained without having to resort to complicated separation and isolation schemes and without complications associated with unpredictable exotherms and gel effects encountered in conventional free radical polymerization processes. The particle size and particle size distribution of the polymer resin particles prepared by processes of the present invention are well defined and easily controlled.

These and other objects of the present invention are accomplished by the provision of processes for the preparation of polymer particles, referred to herein as semisuspension polymerization processes, reference the aforementioned U.S. Pat. Nos. 5,043,404 and 5,164,282, in which a mixture of monomer or comonomers, a free radical polymerization initiator, and a stable free radical agent is bulk polymerized until partial polymerization is accomplished, for example from about 10 to about 50 percent of monomer or comonomers is converted to polymer. The partially polymerized product "prepolymer" or "latomer" is then dispersed, in embodiments, in a nonmiscible liquid phase such as water containing a stabilizing component with, for example, a high shear mixer to permit the formation of a suspension containing small particles therein, and thereafter transferring the resulting suspension product to a reactor, followed by polymerization until complete conversion to the polymer product is achieved. The polymer product can then be washed and dried. More specifically, the process of the present invention is comprised of mixing at least one monomer, a free radical polymerization initiator, and a stable free radical agent; effecting bulk polymerization until from about 10 to about 50 weight percent of the monomer has been polymerized; optionally adding additional monomer and or optionally adding a colorant and dispersing with a high shear mixer the aforementioned partially polymerized product in a suspending media such as water containing a stabilizing component selected from a group consisting of nonionic and ionic water soluble polymeric stabilizers to obtain a suspension of particles with an average diameter of from about 0.1 to about 10 micrometers; polymerizing the resulting suspension to form polymeric particles; and optionally isolating said polymeric particles Embodiments of the present invention comprise the preparation of polymeric particles, which comprises mixing at least one monomer with a polymerization initiator, a free radical polymerization initiator, and a stable free radical agent; effecting bulk polymerization until from about 10 to about 50 weight percent of the monomer has been polymerized; adding additional monomer and or optionally adding a colorant and dispersing the aforementioned partially polymerized monomer product in water containing a stabilizing component to obtain a suspension of particles with an average diameter of from about 0.1 to about 5 microns; and polymerizing the resulting suspension to obtain polymer particles with an average diameter of from about 0.1 to about 10 micrometers and which polymer particles have polydispersities between 1.2 and 6.0. By the phrase "at least one monomer" is intended to include, for example, from about 2 to about 10 and preferably 2 to about 5 dissimilar monomer types, comonomers thereof, and the like, providing the objectives of the present invention are achieved.

Also, the process of the present invention is directed to the preparation of small polymeric particles or polymers, that is with, for example, an average volume particle diameter as determined by known means like a Coulter counter in the range of from about 0.1 micron to about 7 microns, particle size distributions having geometric size distributions(GSD) of from about 1.3 to about 1.6, and a number and weight average molecular weight of from about 2,000 to about 100,000 and from about 2,400 to about 600,000, respectively.

Further, the process of the present invention is directed to the preparation of fine polymeric particles of average diameter of from about 0.1 micron to about 7.0 microns with a number average molecular weight of from about 2,000 to about 50,000 and a weight average molecular weight of from about 2,400 to about 300,000 useful for carrier coatings, as photoreceptor cleaning additives, as toner additives and as fine toner particles. More specifically, the process of the present invention in this embodiment is directed to the preparation of polymeric particles of average diameter in the range of about 0.1 to about 1.0 micron, a number average molecular weight in the range of from about 5,000 to about 50,000, and a weight average molecular weight of from about 100,000 to about 500,000 for carrier powder coatings, toner particles and toner additives. This process is as indicated herein and specifically comprises (1) mixing a monomer or comonomer with a polymerization initiator with the ratio of monomer or comonomers to initiator being from about 100/4 to about 10,000/1, a stable free radical agent with the ratio of monomers or comonomers to stable free radical agent being from about 100/3 to about 10,000/2.5; (2) effecting bulk polymerization by increasing the temperature of the mixture to from initially about 0° to 45° C. to about between 120° C. and 150° C. until from about 10 to about 50 weight percent of monomer or comonomers has been converted to polymer with a number average molecular weight of from 1,000 to about 100,000 and a weight average molecular weight from about 1,200 to about 200,000; (3) dispersing the "latomer" or partially polymerized monomer or prepolymer product in from about 0.1 to about 1, and preferably 0.2 to about 0.4 times the latomer volume or alternatively about 20 to 40 weight percent of the latomer in water containing from about 1 to about 5 weight percent of a stabilizing component, preferably polyvinylalcohol having a weight average molecular weight of from 1,000 to about 10,000, to form a suspension containing particles with a particle size diameter of from 0.1 to about 1.0 micron by using a high shear mixer; (4) transferring the resulting suspension to a reactor and polymerizing the suspension by increasing its temperature to from about 45° C. to about 125° C. and 150° C. to allow the complete conversion of monomer or comonomers to polymer; (5) optionally washing the resulting product with equal volumes of methanol and/or water from about 3 to about 5 times; (6) optionally separating polymeric particles from water/methanol by means of filtration or centrifugation, and (7) optionally drying of the polymeric particles.

The present process in embodiments is comprised of three principal stages: bulk polymerization; suspension-droplet formation; and suspension polymerization, as indicated in accompanying Table 1. Each principal stage may further embody additional or optional substeps, for

| STAGE | PROCEDURE | FUNCTION |
|---|---|---|
| I. | bulk polymerization | prepolymer or latomer formation; "conversion control" |
| II. | suspension/droplet formation | discrete liquid particle formation |
| III. | suspension polymerization | solid particle formation | example, the aforementioned and optional addition of additional free radical initiator in the suspension/droplet formation stage. The first stage (1.) is a stable free radical mediated bulk polymerization a monomer or mixture of monomers, a free radical initiator, and a stable free radical agent. The stable free radical mediated bulk polymerization reaction is used to form a prepolymer or latomer that has well defined physical properties. The well defined properties of the prepolymer mixture or latomer result from the high level of control afforded by the stable free radical mediated bulk process. Stable free radical mediated bulk polymerization enables a high level of control over the extent of the bulk polymerization reaction and over the resulting intermediate bulk polymer product physical properties. Examples of parameters and properties that are easily controlled include: extent of monomer to polymer conversion or degree of a polymerization; control of molecular weight and polydispersity of the bulk product; viscosity of the bulk product; temperature profile control, that is the absence of large exotherms; and gel control or minimization of gel body formation. Control of these parameters further enables a highly reproducible process for the preparation of polymeric particles. The high level of reproducibility of the present process provides intermediate bulk and final products with consistent properties that have little, if any, batch to batch variation. The bulk polymerization reactions accomplished in the first stage of the process of the present invention require elevated temperatures of from about 90° C. to about 150° C. in order to proceed at an industrially useful rate. Alternatively, the rate of the bulk polymerization stage reaction may be accelerated or accomplished at lower temperatures by employing either an acidic organic compound, such a sulfonic or carboxylic acid, or a tertiary amine promoter compound. Cooling the bulk polymerization reaction temperature to below the aforementioned bulk polymerization reaction temperature range effectively quenches the bulk reaction and permits convenient manipulation of the bulk intermediate or latomer product in subsequent steps.

The second stage (II.) involves forming stable liquid particles comprised of the latomer as a discrete phase suspended in a nondissolving continuous phase, comprising, for example, aqueous media, that is media comprised substantially of water. The stable liquid particle dispersion or suspension is formed by dispersing the latomer product with a high shear mixer such as a Brinkmann polytron operating, for example, at 5,000 to 50,000 rpm in, for example, water containing a stabilizer. The stabilizer is selected from known non-ionic or ionic water soluble polymeric stabilizers or surfactants. The amount of stabilizer employed may be used to regulate the particle size and particle size distribution of the resulting suspended liquid particles. A stabilizer or mixture of stabilizers may be selected and are used in amounts of from about 0.1 to about 5 weight percent of the total weight of the suspended latomer product. The liquid particles formed in the shear dispersion step possess have, in embodiments, an average diameter of from about 0.1 to about 10 micrometers.

As an optional step following the initial partial bulk polymerization stage, additional free radical initiator and or a colorant, such as a pigment, may be added to the latomer product just prior to, or during, the suspension stage. Preferably, the additional free radical initiator is highly soluble or freely dispersible in the discrete liquid particle phase and preferentially resides uniformly distributed within the dispersed or organic phase and not in the continuous phase. The optional introduction of additional free radical initiator to the disperse or liquid particle phase provides certain productivity and final polymer product performance advantages, for example, enabling the subsequent suspension polymerization reaction stage to proceed at a faster rate and thereby allowing completion of the overall process in less time than without added initiator. Another advantage of adding additional free radical initiator to the latomer prior to suspension polymerization is that the molecular weight and polydispersity properties of the resulting polymer particles may be altered from very narrow polydispersity polymers obtained without additional free radical initiator of about 1.2 to about 2.0 to polymer products having broader polydispersities of about 2.0 to about 6.0. Thus adding additional free radical initiator after completing bulk polymerization and prior to suspension polymerization may be used to accelerate the suspension polymerization process time and to broaden the polydispersity properties of the final solid polymeric particles and enables the use of lower reaction temperatures in the suspension polymerization step. In the absence of additional free radical initiator the suspension polymerization reaction requires the aforementioned higher reaction temperatures and longer reaction times or alternatively the addition of the aforementioned acidic or amine promoter compounds, as in the bulk polymerization stage. However, final polymer particles obtained without additional free radical initiator added prior to or during the suspension polymerization stage possess very narrow polydispersity properties. Colorants such as pigments may also be optionally added to the liquid droplet suspension after the droplets have been formed if desired so long as the objects of the invention are achieved.

The third stage (III.) of the process is a suspension polymerization wherein the suspended liquid droplets formed in the aforementioned suspension/dispersion stage (II.) are converted into solid polymeric particles having nearly the same particle size and particle size distribution properties as the progenitor suspended liquid droplets formed in stage (II.). The suspended liquid droplets are comprised of latomer and stabilizing agent, and optionally additional added free radical initiator and optional colorant as described above. The stabilizing agent resides preferentially substantially entirely on the surface of the liquid droplet particles. The solid polymeric particles formed in the suspension polymerization stage have desirable and predictable rheological properties that are well suited for use in electrophotographic developer materials such as toner particles, toner surface additives, carrier coatings, and as dispersant resins in preparing, for example, pigment containing thin films that are useful in fabricating photoreceptor devices.

Illustrative examples of monomer or comonomers present in an amount of, for example, from about 80 to about 99 weight percent include vinyl monomers comprised of styrene and derivatives thereof, such as 4-methyl styrene, α-methylstyrene, p-chlorostyrene and the like; unsaturated monocarboxylic acids and their derivatives such as acrylic acid, methyl acrylate, ethyl acrylate, butyl acrylate, dodecyl acrylate, octyl acrylate, phenyl acrylate, methacrylic acid, methyl methacrylate, ethyl methacrylate, butyl methacrylate, octyl methacrylate, acrylonitrile and acrylamide; unsaturated dicarboxylic acids and their derivatives such as maleic acid, monobutyl maleate, dibutylmaleate; vinyl ketones such as vinyl methyl ketone and vinyl ether ketone; and vinyl ethyl and vinyl isobutyl ether; vinyl naphthalene; conjugated dienes such as 1,3-butadiene, isoprene, chloroprene, myrcene, α-ocimene, and the like, and mixtures thereof.

During the bulk polymerization reaction of monomer or mixed monomers to form a latomer of stage I., oligomeric or polymeric species are formed having approximately constant polydispersity properties and are in admixture with unreacted monomers. The reaction time of the bulk polymerization reaction may, in embodiments, be varied over about 1 to 60 hours, preferably between about 2 to 10 hours and preferably about 4 to 7 hours. The optimal reaction time may vary depending upon the temperature, the volume and scale of the reaction, the quantity, ratio and type of polymerization initiator and stable free radical agent selected, and the presence or absence of any of the aforementioned acidic or basic promoter compounds.

The bulk and suspension stage polymerization reaction temperatures are retained relatively constant throughout the heating step by providing an adjustable external heat source and a temperature of from about 60° C. to about 160° C., and preferably between 100° C. and 150° C., and optimally, in embodiments, about 120° C. to 140° C. Reactions performed above 160° C. tend to result in a broadening of the polydispersity. A reaction volume may be selected for any size that enables simple adding, mixing, reacting and isolating intermediate latomer and product resins on an economic or convenient scale.

Illustrative examples of polymerization initiators present in an effective amount of, for example, from about 0.1 to about 20 weight percent of monomer include azo compounds such as 2,2'-azodimethylvaleronitrile, 2,2'-azobisisobutyronitrile, azobiscyclohexanenitrile, and the like, and peroxides such as benzoyl peroxide, lauryl peroxide, 1-1-(t-butylperoxy)-3,3,5-trimethylcyclohexane, n-butyl-4,4-di-(t-butylperoxy)valerate, dicumyl peroxide, and the like, and mixtures thereof.

The free radical initiator can be any free radical polymerization initiator capable of initiating a free radical polymerization process and includes peroxide initiators such as benzoyl peroxide and azo initiators such as 2,2'-azobisisobutyronitrile, and the like. The initiator concentration employed is, for example, from about 0.01 to 4 weight percent, of the total weight of monomer to be polymerized and is determined by the desired molecular weight of the resin. As the initiator concentration is decreased relative to the weight of monomer used, the molecular weight (but not the polydispersity) of the thermoplastic resin product increases.

The stable free radical agent can be any stable free radical and includes nitroxide free radicals, for example, PROXYL (2,2 5,5-tetramethyl-1-pyrrolidinyloxy) free radical, and derivatives thereof, and TEMPO (2,2,6-tetramethyl-1-piperidinyloxy) free radical, and derivatives thereof, and the like. These stable free radical agent materials are well known in the literature as free radical polymerization inhibitors, see for example, G. Moad, et.al., *Tetrahedron Letters*, 22, 1165 (1981). They have also been used to reversibly cap the ends of growing chains to produce oligomers, see for example, EP 0 135 280. However, although not wanting to be limited by theory, under the bulk polymerization reaction conditions, and the suspension polymerization reaction conditions not having optional additional free radical initiator added, of the present invention, stable free radical agents function as moderators to harness the normally highly reactive and indiscriminate intermediate growing polymer chain free radical species as thermally labile covalent adducts comprised of an oligomer or incipient polymer product and a stable free radical agent. The rate at which these adducts homolytically cleave back into a free radical terminated polymer chain and a stable free radical is believed to be a rate limiting step which regulates the addition of monomer to the growing chain and which precludes premature chain termination which termination would ordinarily yield polymer products having broad polydispersities. Also, under the polymerization conditions of the present invention, all chains are initiated at about the same time. Initiating all the chains at about the same time and limiting the rate of addition of monomer to the growing chains allows the bulk polymerization stage to be stopped or suspended, in a highly reproducible manner, at the aforementioned desired levels of monomer to polymer conversion.

The molar ratio of the stable free radical (SFR) agent to free radical initiator (INIT) is, for example, from about 0.4 to 4, and preferably in the range from about 0.9 to 1.6. Although not wanting to be limited by theory, in an embodiment, the molar ratio [SFR:INIT] of stable free radical agent, for example, TEMPO, to free radical initiator, for example, benzoyl peroxide, of about 1.3 is believed to be important for success of the process when the reaction is performed at between 125° C. and about 140° C. If the [SFR:INIT] is too high then the reaction rate is noticeably inhibited. If the [SFR:INIT] is too low then the reaction product has undesired increased polydispersity. It should be noted that when styrene is polymerized to polystyrene without the stable free radical agent of the present process invention the product polymers isolated have polydispersities of 2.0 and above.

In embodiments, the molar ratio of monomer content to stable free radical agent to free radical initiator is from about 100:3:4 to about 10,000:2.5:1 and preferably in the range of about 300:1.3:1 to about 7,000:1.3:1.

Processes of the present invention, in embodiments, provide for high overall monomer to polymer conversion rates, or degrees of polymerization, for example of 90 percent by weight or greater and specifically from about 91 to about 99 percent in embodiments for the combined bulk and suspension polymerization reactions taken together.

Processes of the instant invention, in embodiments provide for weight average molecular weights ranging from about 5,000 to about 300,000 for the polymer product.

The monomers that can be used are any monomer capable of undergoing a free radical polymerization and include but are not limited to styrene, substituted styrenes and derivatives thereof, for example, methylstyrene, acrylates, methacrylates, butadiene and any conjugated diene monomer sufficiently reactive under the specified stable free radical moderated polymerization reaction conditions to afford an adduct of a stable free radical agent and a high molecular weight polymer product for example, butadiene, isoprene and myrcene.

The bulk polymerization reaction rate of the monomers may, in embodiments, be accelerated and the reaction time reduced to about 4 to 7 hours from greater than 16 hours by the addition of a small amount of a protic acid, for example, between 0.05 and 2.0 percent based on the total molar momomer concentration, that will not also initiate competing cationic polymerization. The protic acid may be selected from the group consisting of organic sulfonic and carboxylic acids where camphorsulfonic acid is a preferred acid and where the molar ratio of stable free radical agent to organic acid is from about 1:1 to 11: 1, with a preferred ratio of between about 1.5:1 and 5:1. Excessive addition of organic acid beyond the aforementioned amounts causes the resin polydispersity to broaden.

Additional optional known additives may be selected for the polymerization reactions and which may provide additional convenience by minimizing or eliminating subsequent manipulative or processing steps and providing performance enhancements to the resulting product, for example, colorants, lubricants, release or transfer agents, surfactants, stabilizers, antifoams, and the like thereby enabling, for example, toner compositions.

An optionally added colorant can be a pigment selected from the group consisting of carbon black like Regal 330® or MAPICO BLACK™ or magnetites, cyan, magenta, yellow, red, blue, green, brown, and mixtures thereof, and which pigment is used in an amount of from about 3 to about 15 weight percent based on the total weight of monomers used in the bulk polymerization.

Polymer resins possessing monomodal properties, that is a well defined and narrow molecular weight distribution and polydispersity, may in embodiments thereof provide several advantages, particularly for electrophotographic toner and carrier coating compositions such as: improved rheology properties including improved hot melt flow, reduced hot offset, reduced blocking and desired elasticity.

The processes of the present invention can be selected to form a wide variety of polymers. For example, it can be used to polymerize a styrene monomer to form polystyrene or butadiene to form polybutadiene. The process of the present invention can be selected to polymerize a mixture of two or more different polymerizable monomers to form copolymers therefrom, for example, polymerization of styrene and butadiene to form poly(styrene-butadiene), styrene and isoprene to form poly(styrene-isoprene), styrene and butyl acrylate to form poly(styrene-butyl acrylate), styrene and methyl methacrylate to form poly(styrene-methyl methacrylate), and the like, and mixtures of monomers thereof, including copolymers and terpolymers.

A suitable reaction medium employed for conducting the bulk or latent polymer stage polymerization of processes of the present invention may be selected from the group consisting of bulk or neat, suspension, emulsion, and solution systems. However, as mentioned earlier and indicated hereinafter, a preferred medium for the latent polymerization step is bulk or neat. The so-called suspension polymerization step may be conducted as either a suspension or alternatively as an emulsion polymerization reaction.

A prepolymer mixture or latomer formed in the bulk stage polymerization reaction of the present invention is obtained by prematurely terminating a polymerization process, summarized in the accompanying scheme, and disclosed in the aforementioned copending application U.S. Ser. No. 976, 604 (D/92579), by cooling the heated reaction mixture to below about 60° C. to 80° C. to yield a mixture of intermediate or latent product polymers and unreacted monomers. By the term "latomer" is meant an incipient or incomplete polymer product, that is a latent polymer entity in admixture with unreacted monomer. The latomer may be transferred to another reaction vessel for dispersing in a suspending medium or the latomer may be directly dispersed in situ by adding a suitable suspending medium, for example, water or alcohol, and mixtures thereof, and a stabilizer or surface active agent.

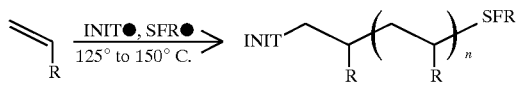

$M_w/M_n = 1.2$ to $2.0$

Stabilizers for use in the suspension polymerization reaction stage can be present in an amount of, for example, from about 0.1 to about 5 weight percent of water in the suspending medium and are selected from the group consisting of both nonionic and ionic water soluble polymeric stabilizers such as methyl cellulose, ethyl cellulose, hydroxypropyl cellulose, block copolymers of ethylene and propylene oxide such as Pluronic E87 from BASF, sodium salt of carboxyl methyl cellulose, polyacrylate acids and their salts, polyvinyl alcohol, gelatins, starches, gums, alginates, zein and casein and the like; and particulate barrier stabilizers such as tricalcium phosphate, talc, barium sulfate, and the like. Among these polyvinyl alcohol with a weight average molecular weight of from about 1,000 to about 10,000 is particularly useful.

Also, stabilizer present on the surface of the product polymeric particles can be washed off the polymer particles using an alcohol such as, for example, methanol and the like, or water. Separation of washed particles from solution can be achieved by any classical separation technique such as filtration, centrifugation, and the like. Classical drying techniques such as vacuum drying, freeze drying, spray drying, fluid bed drying, and the like can be selected for drying of the polymeric particles.

The particles of the present invention can be selected as carrier coatings, which carriers contain, for example, a steel core, and can be admixed with toner compositions comprised of resin particles, pigment particles and optional additives such as charge control components, reference U.S. Pat. No. 4,560,635, the disclosure of which is totally incorporated herein by reference enabling the formation of a developer composition useful in electrophotographic imaging processes.

The following examples are being submitted to further define various species of the present invention. These examples are intended to be illustrative only and are not intended to limit the scope of the present invention. Also, parts and percentages are by weight unless otherwise indicated.

EXAMPLE I

A solution of styrene (11 grams, 0.106 mole), TEMPO (0.25 gram, 0.0016 mole) a stable free radical agent available from Aldrich Chemical Co., and benzoyl peroxide (0.30 gram, 0.0012 mole) was added to a three neck round bottom flask equipped with a thermometer, a condenser and a gas inlet adapter. The reaction vessel was flushed with argon and the reaction mixture was heated for 6.5 hours in an oil bath maintained at a temperature of 138° C. to 140° C. The internal temperature reached 136° C. after about 4 to 5 minutes and was maintained at this temperature for the rest of the reaction. Samples (50 microliters) from the reaction mixture were removed at the times indicated in Table 1 and the percent conversion of the monomer remaining in the mixture was determined by measuring the amount of styrene monomer remaining in the reaction mixture. Percent conversion was determined by gas chromatography analysis using a Perkin Elmer SIGMA 2000 gas chromatograph with a Perkin Elmer LCI-100 Laboratory Computing Integrator. The columns used were Carbowax 20M supplied by Supelco.

EXAMPLE II

The above reaction was repeated under the same conditions with the same amount of reagents. Samples (50 microliters) were removed from the reaction mixture at the times indicated in Table 1 and residual styrene monomer content was determined by gas chromatography to calculate percent conversion.

TABLE 1

Bulk Polymerization of Styrene

| Sample | Reaction Time (Hours) | Example I % Conversion | Example II % Conversion |
| --- | --- | --- | --- |
| 1 | 1.5 | 2 | 0 |
| 2 | 2 | 7 | 2.0 |
| 3 | 3.5 | 35 | 35 |
| 4 | 4.5 | 44 | 43 |
| 5 | 6.5 | 62 | 63 |

EXAMPLE III 2,2-azo-bis(2,4-dimethylvaleronitrile) may be added to the cooled bulk mixtures prepared as described in Examples I and II, and stopped at the desired degree of conversion of from about 10 to about 50 weight percent over a period of 2 to about 10 hours. The mixture is dispersed with a polytron at 10,000 rpm for 2 minutes with a Brinkmann PT456G high shear homogenizer (optional addition of color pigments and can be introduced at this stage). This organic phase is then added to an aqueous phase comprising of 1,000 grams of water containing 1.0 weight percent TYLOSE® (93800-methyl cellulose) having a weight average molecular of about 120,000, and 0.05 weight percent of sodium dodecyl sulphate (SDS). The whole mixture is then polytroned at 10,000 rpm for 3 minutes with a Brinkmann PT456G high shear homogenizer to provide microsuspension of particles in water. The suspension is then transferred into a 3 liter reaction vessel equipped with agitator and stirred at 250 rpm. The contents of the reactor is then heated up to 70° C. and held for 6 hours by means of computer assisted control system. The resulting polymerized particles are then cooled to about 25° C. and placed in 1 liter centrifuge bottles and centrifuged at 3,000 rpm for 10 minutes. The supernatant liquid consisting of TYLOSE®, SDS and water is decanted. Fresh water is then added and the settled toner particles are reslurried by mixing. The washing procedure is repeated up to six more times. After the final wash the toner particles are reslurried with minimum water and placed in freeze drying bottles and freeze dried to give clean dry individual toner particles. The particles produced are believed to possess volume average particle diameter size of 6 to 7 micrometers as may be determined by a Coulter counter particle size analyzer.

EXAMPLE IV

The process of Example I is repeated, then the organic phase is dispersed in water containing 1.0 weight percent polyvinyl alcohol (88% hydrolyzed), having a weight average molecular weight of 96,000 and 0.03 weight percent sodium dodecyl sulphate (SDS). The resulting toner is believed to possess average volume particle diameter size of 6 to 7 micrometers.

Other embodiments and modifications of the present invention may occur to those skilled in the art subsequent to a review of the information presented herein; these embodiments and modifications, as well as equivalents thereof, are also included within the scope of this invention

What is claimed is:

1. A process for the preparation of a polymer comprising: effecting bulk polymerization of a mixture comprised of at least one monomer, a free radical polymerization inhibitor, and a stable free radical agent wherein the stable free radical agent is comprised of nitroxide stable free radicals selected from the group consisting of 2,2,5,5-tetramethyl-1-pyrrolidinyloxy free radical, derivatives thereof, 2,2,6,6-tetramethyl-1-piperidinyloxy free radical, derivatives thereof 2,2,4,4-tetramethyl-3-oxazolidinyloxy free radical, derivatives thereof and mixtures thereof until from about 10 to about 50 weight percent of the monomer has been polymerized to form a bulk polymerization product;

optionally adding additional free radical initiator to said bulk polymerization product; optionally adding a colorant to said bulk polymerization product;

dispersing said bulk polymerization product with a high shear mixer into water containing a stabilizing component selected from the group consisting of non-ionic and ionic water soluble polymeric stabilizers to obtain a suspension of particles or droplets comprised of said bulk polymerization product with said particles having an average diameter of from about 0.1 to about 10 microns; and polymerizing the resulting bulk polymerization product suspension in water to form said polymer.

2. A process in accordance with claim 1 wherein a mixture of monomers is selected.

3. A process in accordance with claim 2 wherein the mixture contains from 2 monomers to about 5 monomers.

4. A process in accordance with claim 1 wherein the polymer obtained is subjected to washing and drying and optionally isolating the polymer.

5. A process in accordance with claim 1 wherein the polymer obtained has an average particle diameter of from about 0.1 micron to about 7 microns.

6. A process in accordance with claim 1 wherein the suspension polymerization is accomplished by heating at a temperature of from about 45° to about 150° C.

7. A process in accordance with claim 1 wherein the bulk polymerization is accomplished by heating from about 80° to about 150° C.

8. A process in accordance with claim 1 wherein the polydispersity of the bulk polymerization product mixture remains about constant throughout the bulk polymerization process and is in the range of from about 1.2 to about 2.0.

9. A process in accordance with claim 1 wherein the polydispersity of the suspension polymerization product resin is in the range of from about 1.2 to about 6.0.

10. A process in accordance with claim 1 wherein the number and weight average molecular weight of polymer in the bulk polymerization is between about 1,000 to about 100,000 and about 1,200 to about 200,000, respectively.

11. A process in accordance with claim 1 wherein the number and weight average molecular weight of the polymer of the suspension polymerization is between about 2,000 to about 200,000 and about 2,400 to about 600,000, respectively.

12. A process in accordance with claim 1 wherein the monomer is selected from the group consisting of styrene and its derivatives.

13. A process in accordance with claim 1 wherein the monomer is selected from the group consisting of α-methylstyrene, p-chlorostyrene, 4-methyl styrene, 3-fluorostyrene, 2,3,4,5,6-pentafluorostyrene, vinyl naphthalene, and mixtures thereof.

14. A process in accordance with claim 1 wherein the monomer is selected from the group consisting of unsaturated monocarboxylic acids, unsaturated monocarboxylic esters and unsaturated carboxylic anhydrides, and mixtures thereof.

15. A process in accordance with claim 1 wherein the monomer is selected from the group consisting of acrylic acid, methacrylic acid, methyl acrylate, ethyl acrylate, butyl acrylate, dodecyl acrylate, octyl acrylate, phenyl acrylate, methacrylic acids, methyl methacrylate, ethyl methacrylate, butyl methacrylate, octyl methacrylate, dodecyl methacrylate, maleic acid, monobutyl maleate, dibutyl maleate, and mixtures thereof.

16. A process in accordance with claim 1 wherein the monomer is selected from the group consisting of acrylonitrile, acrylamide, methacrylamide, acrolein, methacrolein and vinyl chloride, and mixtures thereof.

17. A process in accordance with claim 1 wherein the monomer is selected from the group consisting of conjugated dienes and their derivatives.

18. A process in accordance with claim 1 wherein the monomer is selected from the group consisting of 1,3-butadiene, isoprene, chloroprene, myrcene, α-ocimene, and derivatives thereof.

19. A process in accordance with claim 1 wherein the free radical polymerization initiator is selected from the group consisting of azo and peroxide compounds.

20. A process in accordance with claim 19 wherein the polymerization initiator is benzoyl peroxide, lauryl peroxide, 1,1-(t-butylperoxy)-3,3,5-trimethylcyclohexane, n-butyl-4,4-di-(t-butylperoxy)valerate, dicumyl peroxide, 2,2'-azodimethylvaleronitrile, 2,2'-azoisobutyronitrile, azobiscyclohexanenitrile, and mixtures thereof.

21. A process in accordance with claim 1 wherein the stabilizing component is selected from the group consisting of methyl cellulose, ethyl cellulose, hydroxypropyl cellulose, block copolymers of ethylene and propylene oxides and derivatives thereof; the sodium salt of carboxyl methyl cellulose, polyacrylic acids and their salts, polyvinyl alcohol, gelatins, starches, gums, alginates, zein, sodium dodecylsulfate, casein, and mixtures thereof.

22. A process in accordance with claim 1 wherein the stabilizing component is a fine particulate tricalcium phosphate, talc or barium sulfate.

23. A process in accordance with claim 1 wherein the stable free radical agent is comprised of a compound containing an oxygen or carbon atom bearing a stable free radical species which reversibly reacts with the end of the propagating chain of the bulk or suspension polymer above about 90° C.

24. A process in accordance with claim 1 wherein the bulk polymerization is from about 1 to 60 hours.

25. A process in accordance with claim 1 wherein the suspension polymerization is from about 1 to 24 hours.

26. A process in accordance with claim 1 wherein the optionally added additional free radical initiator is selected from the group consisting of benzoyl peroxide, lauryl peroxide, 1,1-(t-butylperoxy)-3,3,5-trimethylcyclohexane, n-butyl-4,4-di-(t-butylperoxy)valerate, dicumyl peroxide, 2,2'-azodimethylvaleronitrile, 2,2'-azoisobutyronitrile, and azobiscyclohexanenitrile in an amount of from about 0.05 to about 5 weight percent based on the total weight of monomers used in the bulk polymerization.

27. A process in accordance with claim 1 wherein the optionally added colorant is a pigment selected from the group consisting of carbon black, magnetites, cyan, magenta, yellow, red, blue, green, brown, and mixtures thereof, and is in an amount of from about 3 to about 11 weight percent based on the total weight of monomers used in the bulk polymerization.

28. A process in accordance with claim 1 wherein the polymer has a gel content of from 0.0 to about 35 weight percent.

29. A process in accordance with claim 1 wherein the bulk polymerization is effected by heating from about 90° to about 150° C. and wherein the polymeric chains of the bulk resin are formed simultaneously at from about one second to about 10 minutes after said heating has attained about 120° C.

30. A process in accordance with claim 1 further comprising adding an organic sulfonic or organic carboxylic acid compound to the bulk polymerization mixture of monomers thereby increasing the rate of formation of bulk polymer mixture from monomer compound.

31. A process in accordance with claim 1 further comprising adding a tertiary amine promoter compound to the bulk polymerization mixture thereby increasing the rate of dissociation of the free radical initiator and where the free radical initiator is an organic peroxide.

32. A process in accordance with claim 1 wherein the molar ratio of monomer to stable free radical agent to free radical initiator in the bulk polymerization reaction is from about 100:3:4 to about 10,000:2.5:1.

33. A polymer or copolymer resin obtained by the process of claim 1 wherein the resin has a weight average molecular weight ($M_w$) of from about 1,200 to 600,000 and a number average molecular weight ($M_n$) of from about 2,000 to about 100,000 and a polydispersity of about 1.2 to 6.0 and the resulting polymer in is the form of particles that have a geometric size distribution of from about 1.3 to about 1.6.

34. A process in accordance with claim 1 wherein the stable free radical agent to free radical initiator molar ratio SFR:INIT is from about 1.2 to 1.8.

35. A process in accordance with claim 1 wherein said free radical initiator has a half life of less than or equal to 10 minutes at above about 100° C.

36. A process in accordance with claim 1 wherein said free radical initiator has a half life of less than or equal to 1 minute at above about 100° C.

37. A process in accordance with claim 1 wherein said free radical initiator has a half life of from about 5 seconds to about 10 minutes at above about 100° C.

38. A process in accordance with claim 1 wherein the polydispersity of the bulk polymerization product mixture remains about constant throughout the bulk polymerization process and in the range of in excess of 1.0 to about 1.45.

39. A process in accordance with claim 1 wherein the polydispersity of the polymer product resulting from the suspension polymerization remains about constant throughout the suspension polymerization and is in the range of in excess of 1.0 to about 1.45.

40. A process in accordance with claim 1 wherein the polydispersity of the polymer product is from in excess of 1.0 to about 1.45 and wherein the conversion of monomer to polymer for said process is from about 50 to 100 percent.

41. A process in accordance with claim 1 wherein said optionally adding additional free radical initiator to said bulk polymerization product or suspension droplet particles provides an accelerated suspension polymerization reaction rate and a broadened polydispersity of said polymer of from about 2.0 to about 6.0.

42. A process in accordance with claim 1 further comprising adding additional monomer to said bulk polymerization product or suspension droplet particles and wherein the weight average and number average molecular weight properties of said polymer obtained from the suspension polymerization increase and the polydispersity properties remain about constant.

* * * * *